(12) United States Patent
Tseng

(10) Patent No.: US 6,968,734 B2
(45) Date of Patent: Nov. 29, 2005

(54) PEN-SHAPED TIRE PRESSURE GAUGE

(76) Inventor: Jui-Tsun Tseng, No. 417-100, Sec. 4, Kung Hsueh Road., Tainan (TW) 709

(*) Notice: Subject to any disclaimer, the term of this patent is extended or adjusted under 35 U.S.C. 154(b) by 0 days.

(21) Appl. No.: 10/800,624

(22) Filed: Mar. 16, 2004

(65) Prior Publication Data
US 2005/0204807 A1    Sep. 22, 2005

(51) Int. Cl.[7] .............................................. B60C 23/02
(52) U.S. Cl. ................................................... 73/146.8
(58) Field of Search ........................... 73/146.2, 146.3, 73/146.4, 146.5, 146.8

(56) References Cited
U.S. PATENT DOCUMENTS
4,501,142 A * 2/1985 Huang ........................ 73/146.8

* cited by examiner

Primary Examiner—William Oen
(74) Attorney, Agent, or Firm—Bacon & Thomas

(57) ABSTRACT

A pen-shaped tire pressure gauge includes a hollow body having one end formed with a pressure measuring head and the other end formed with an open end and its interior formed with an accommodating space. The pressure measuring head is formed with an air intake passageway communicating with the accommodating space and has its outside fitted with a metallic protecting ring. A scale rod is received in a coiled spring and they both are positioned in the hollow body. The coiled spring is fitted with a piston at the upper end, and the scale rod is fitted with a stop ring and a stop sleeve around the lower end. A fixing cap is combined with the open end to prevent the components inside the hollow body from dropping out, strengthening the pressure measuring head to prolong its service life.

6 Claims, 5 Drawing Sheets

PEN-SHAPED TIRE PRESSURE GAUGE

BACKGROUND OF THE INVENTION

1. Field of the Invention

This invention relates to a pen-shaped tire pressure gauge, particularly to one having its pressure measuring head reinforced to prevent it from worn off and prolong its service life.

2. Description of the Prior Art

Most conventional pen-shaped tire pressure gauges are pen-shaped and respectively provided with a pen clip, easy to be carried and having beautiful appearance; therefore they are widely used in related business.

However, the pressure measuring head of the conventional pen-shaped tire pressure gauge is likely to become worn off and the scale rod inside may be pressed to bounce out by inner air pressure after used for a period of time. This is because the body and the interior components of a conventional pen-shaped tire pressure gauge are injection molded of plastic for the purpose of lowering producing cost and facilitating a producing process. Therefore, the plastic pressure measuring head of the conventional tire pressure gauge will become worn off after long-term and continuous contact and pressing against the metallic tube valves of tires for measuring, most likely to render the pressure measuring head cracked and damaged. In addition, during pressure measuring, the scale rod inside the gauge body is pressed by inner high pressure to move outward to indicate the tire pressure thereon. Under the circumstances, the portion around the open end of the tire pressure gauge is inevitable to be frequently bumped by the scale rod and become damaged, rendering the scale rod easy to bounce outward and become damaged. Therefore, it is of great importance to strengthen the pressure measuring head and stabilize the portion around the open end of a pen-shaped tire pressure gauge.

SUMMARY OF THE INVENTION

The objective of the invention is to offer a pen-shaped tire pressure gauge having its pressure measuring head and the portion around its open end strengthened to prevent them from being worn off and damaged to prolong the service life of the pen-shaped tire pressure gauge.

The pen-shaped tire pressure gauge in the present invention includes a hollow body having one end formed with a recessed pressure measuring head and the other end formed with an open end and its interior formed with an accommodating space. The hollow body has its recessed pressure measuring head fitted therein with a rubber ring having a press rod protruding out through the center, with an air intake passage formed between the rubber ring and the press rod and communicating with the interior of the hollow body. The pressure measuring head has its outside fitted with a metallic protecting ring and its backside formed integral with an exhausting push rod not communicating with the interior of the hollow body, and the open end of the hollow body is provided with a combining unit. A coiled spring is positioned in the accommodating space of the hollow body and fitted with a piston at the upper end facing the pressure measuring head. A scale rod is received in the coiled spring and then they both are positioned in the hollow body. The scale rod has its outer wall marked with pressure value graduations and its lower end mounted with a stop ring and a stop sleeve. A fixing cap is assembled with the combining unit of the open end of the hollow body to prevent the components received in the hollow body from dropping out.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
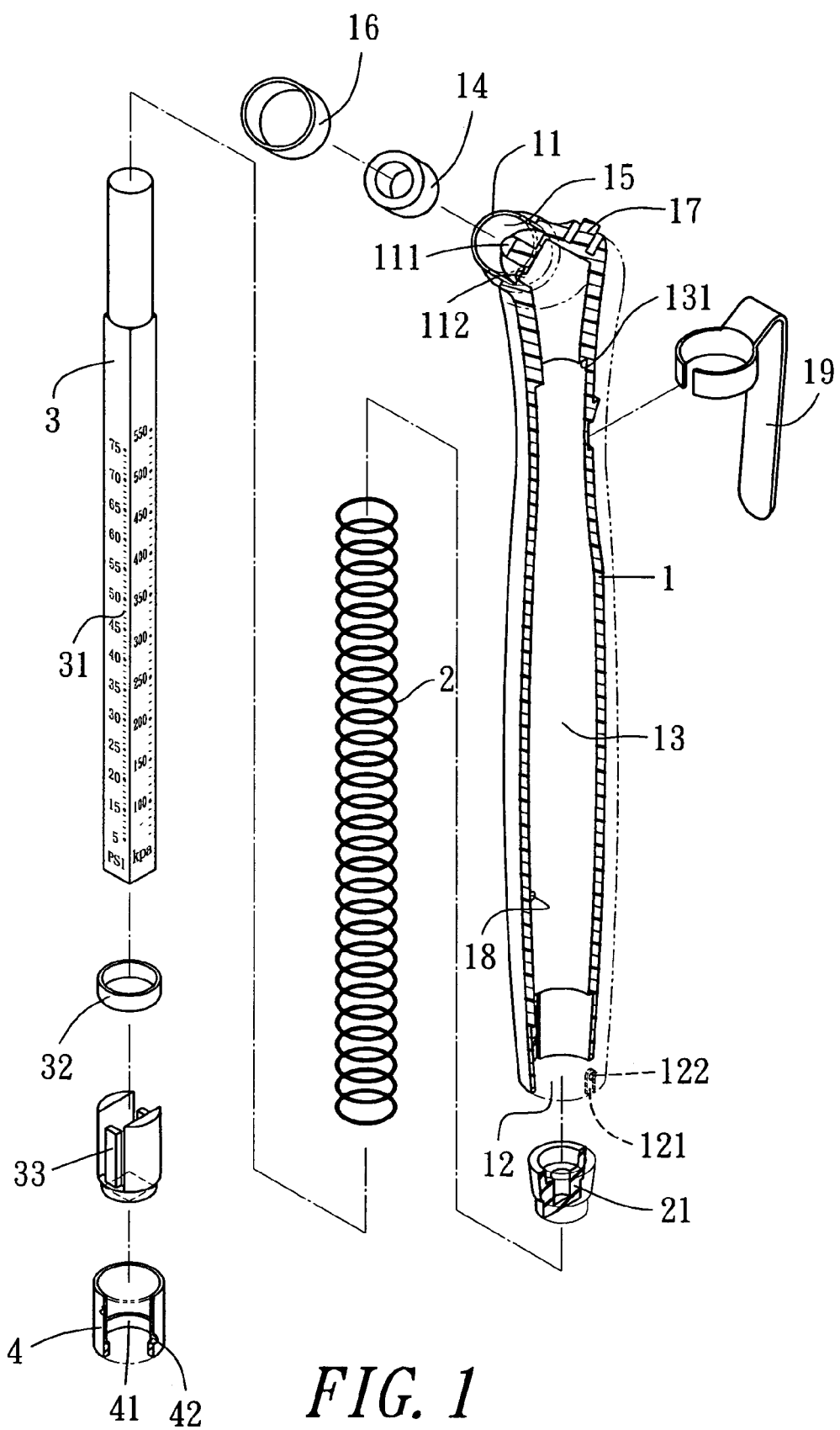
FIG. 1 is an exploded perspective view of a first preferred embodiment of a pen-shaped tire pressure gauge in the present invention.

A first preferred embodiment of a pen-shaped tire pressure gauge in the present invention, as shown in FIG. 1, includes a hollow body 1, a coiled spring 2, scale rod 3 and a fixing cap 4 as main components combined together.

The hollow body 1 is pen-shaped, having one end formed with a recessed pressure measuring head 11 and the other end formed with an open end. The body 1 has its interior formed with an accommodating space 13 having its inner wall formed with an annular stepped surface 131 near the pressure measuring head 11. The pressure measuring head 11 of the hollow body 1 is inserted therein with a rubber ring 14 and formed integral with a press rod 111 protruding out through the center of the rubber ring 14, having an air intake passage 15 formed between the rubber ring 14 and the press rod 111 and an air intake hole 112 bored at the bottom of one side of the press rod 111 to communicate the accommodating space 13 with the air intake passageway 15. In addition, the pressure measuring head 11 has its outside fitted with a metallic protecting ring 16 and its backside formed integral with an exhausting push rod 17 not communicating with the interior of the hollow body 1. Further, the hollow body 1 is bored with an exhausting hole 18 in the wall near the open end 12 and two opposed insert grooves 121 and two opposed engage holes 122 formed in the inner wall of the open end 12. Therefore, a pen clip 19 is fixed on the outer wall near the pressure measuring head 11 to be clipped with a user's pocket.

The coiled spring 2 is received in the accommodating space 13 of the hollow body 1 and fitted with a piston 21 at the upper end facing the pressure measuring head 11.

The scale rod 3 is fitted in the coiled spring 2 and they both are positioned in the hollow body 1. The scale rod 3 has its outer wall marked with pressure value graduations 31 and its lower end fitted with a stop ring 32 and a stop sleeve 33.

The fixing cap 4 to be fitted around the stop sleeve 33 of the scale rod 3 and inserted in the open end 12 of the hollow body 1 has one end of its inner wall formed with a stop wall 41 and its outer wall formed integral with two opposed engage projections 42 to be respectively moved along the two insert grooves 121 in the inner wall of the open end 12 of the hollow body 1 and then engaged firmly in the two engage holes 122.

Figure 2:
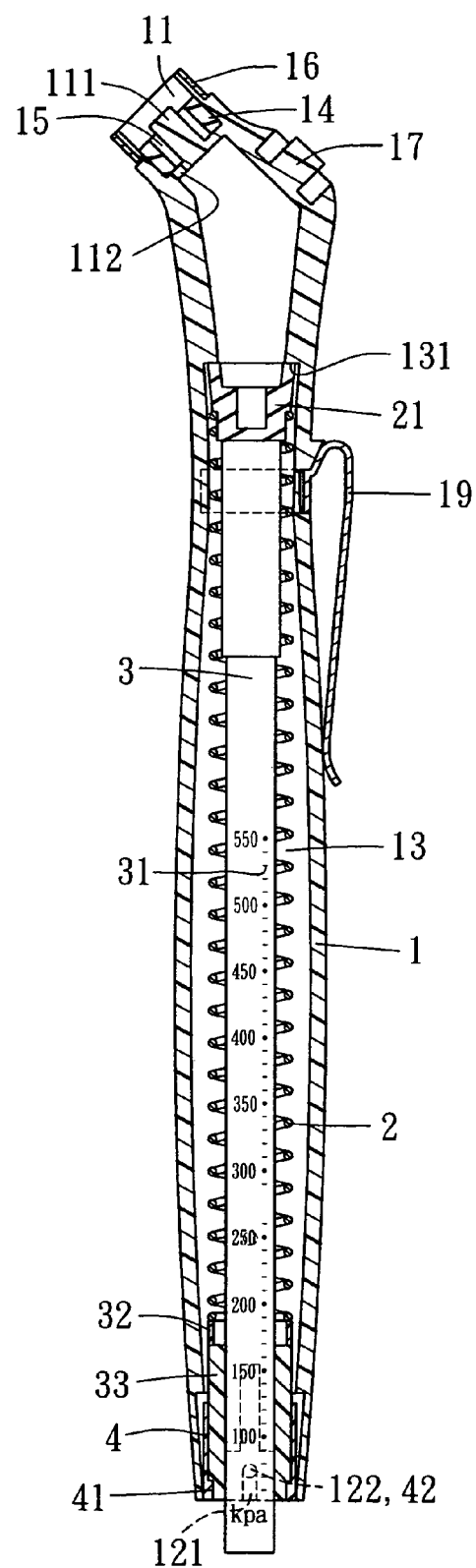
FIG. 2 is a cross-sectional view of the first preferred embodiment of the pen-shaped tire pressure gauge in the present invention.

In assembling, as shown in FIG. 2, firstly, the rubber ring 14 is fitted in the pressure measuring head 11, with the air intake passageway 15 formed between the rubber ring 14 and the press rod 111 to communicate with the accommodating space 13 of the hollow body 1 via the intake hole 112. Next, the metallic protecting ring 16 is fitted around the outside of the pressure measuring head 11, and then the coiled spring 2 with the piston 21, the scale rod 3, the stop ring 32 and the stop sleeve 33 are all together received in the accommodating space 13 of the hollow body 1 through the open end 12, letting the piston 21 at the upper end of the coiled spring 2 push upward the lower edge of the stepped surface 131 of the accommodating space 13 and positioned properly. Lastly, the fixing cap 4 is inserted in the open end 12 of the hollow body 1 and fitted around the stop sleeve 33 to be positioned between the open end 12 and the stop sleeve 33, with its inner stop wall 41 pushing against and restricting the stop sleeve 33 in its position. Synchronously, the fixing cap 4 has the two opposed engage projections 42 on its outer wall respectively moved along the two insert grooves 121 in the inner wall of the open end 12 of the hollow body 1 and then engaged in the two engage holes 122 to firmly combine the fixing cap 4 with the body 1 together and prevent the components in the accommodating space 13 from dropping out, thus finishing assembly of the pen-shaped tire pressure gauge.

Figure 3:
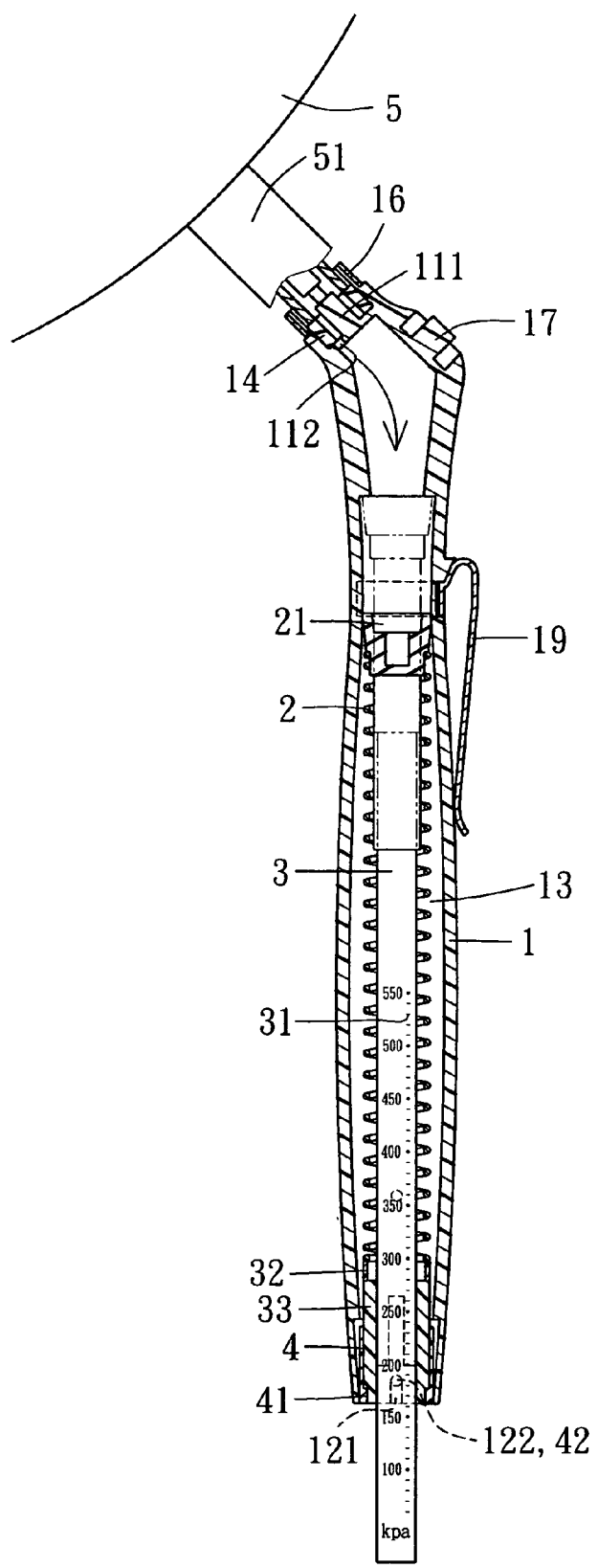
FIG. 3 is a cross-sectional view of the first preferred embodiment of the pen-shaped tire pressure gauge in a first operating mode in the present invention.
Figure 4:
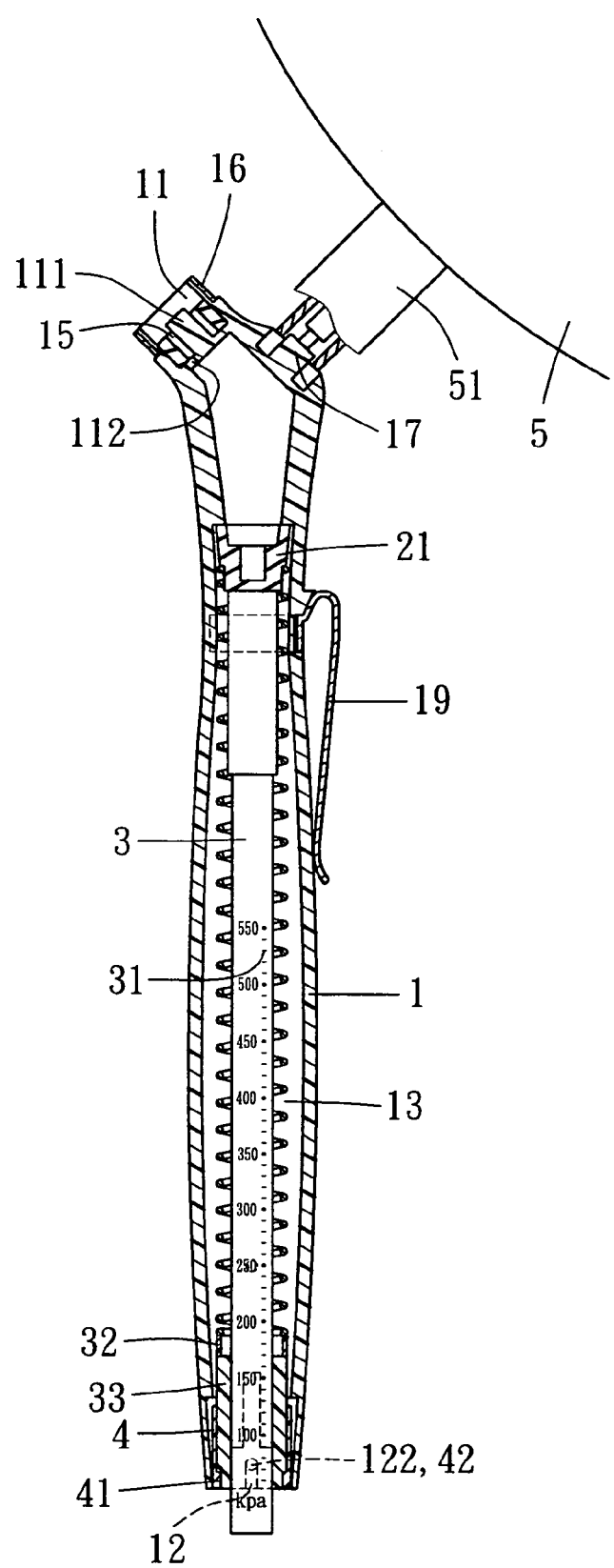
FIG. 4 is a cross-sectional view of the first preferred embodiment of the pen-shaped tire pressure gauge in a second operating mode in the present invention.

In using, as shown in FIG. 3, simply hold the hollow body 1 and force the press rod 111 of the pressure measuring head 111 press the tube valve 51 of a tire 5 to move inward to let air inside the tire 5 leak out and get into the accommodating space 13 of the hollow body 1 through the air intake passageway 15 and the air intake hole 112 to push against the piston 21 and press the coiled spring 2. Simultaneously, the coiled spring 2 will push the scale rod 3 to extend out of the open end 12 and the air in the accommodating space 13 will flow out from the exhausting hole 18 of the hollow body 1. Thus, a user is able to know the pressure data of the tire by reading the graduations indicated on the outer wall of the scale rod 3. In case the tire pressure is found insufficient, the tire has to be inflated to a required one; on the contrary, if the tire pressure is found excessively high, only the exhausting push rod 17 has to be pressed to make the tube valve 51 of the tire 5 to move inward to exhaust out the surplus air in the tire 5, as shown in FIG. 4.

Figure 5:
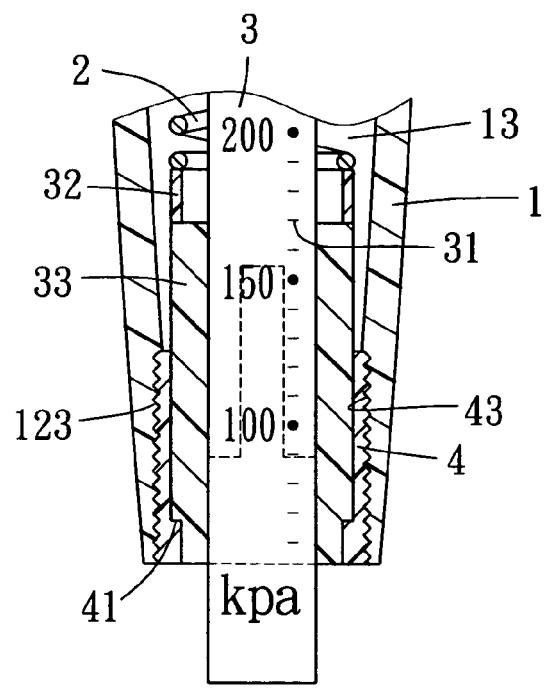
FIG. 5 is a partial magnified cross-sectional view of a second preferred embodiment of a pen-shaped tire pressure gauge in the present invention.

A second preferred embodiment of a pen-shaped tire pressure gauge in the present invention, as shown in FIG. 5, is to have the inner wall of the open end 12 of the hollow body 1 provided with female threads 123, and the outer wall of the fixing cap 4 provided with male threads 43. Thus, the fixing cap 4 can be threadably and fixedly combined with the open end 12 of the hollow body 1 to prevent the components inside the hollow body 1 from dropping out.

Figure 6:
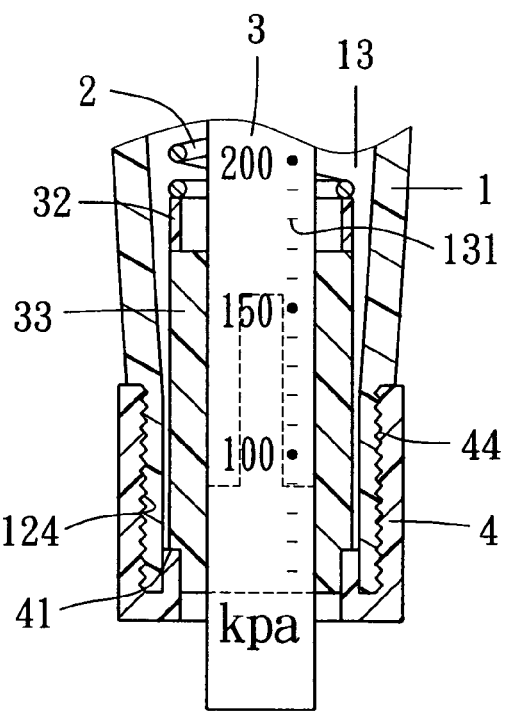
FIG. 6 is a partial magnified cross-sectional view of a third preferred embodiment of a pen-shaped tire pressure gauge in the present invention.

A third preferred embodiment of a pen-shaped tire pressure gauge in the present invention, as shown in FIG. 6, is to have the inner wall of the fixing cap 4 formed with female threads 44, and the outer wall of the open end 12 of the hollow body 1 formed with male threads 124 to threadably and firmly combine the fixing cap 4 with the open end 12 of the hollow body 1.

As can be understood from the above description, this invention has the following advantages.

1. Prolonging service life: The pressure measuring head 11 has its outer portion fitted with the metallic protecting ring 16 to increase its strength and prevent it from being worn off in spite of frequently pressing on the metallic tube valve 51 of a tire 5, as shown in FIGS. 1 and 2.

2. Having stability of combination: The fixing cap 4 can be firmly combined with the hollow body 1 by mutual engagement of the engage projections 42 of the fixing cap 4 and the engage holes 122 of the hollow body 1, as shown in FIG. 2, or by threads combination, as shown in FIGS. 5 and 6, able to prevent the components inside the accommodating space 13 of the hollow body 1 from dropping out.

3. Having two functions of pressure measuring and air exhausting: The pressure measuring head 11 is provided for measuring tire pressure, while the exhausting push rod 17 provided on the backside of the pressure measuring head 11 is for air exhausting.

4. Convenient to be carried: The tire pressure gauge is pen-shaped and provided with a pen clip 19 on the hollow body 1, convenient to be clipped with a user's pocket and carried about easily.

While the preferred embodiments of the invention have been described above, it will be recognized and understood that various modifications may be made therein and the appended claims are intended to cover all such modifications that may fall within the spirit and scope of the invention.

I claim:

1. A pen-shaped tire pressure gauge comprising:
   a hollow body having one end formed with a recessed pressure measuring head, said hollow body having the other end formed with an open end, said hollow body having its interior formed with an accommodating space, said accommodating space formed with an annular stepped surface on the inner wall near said pressure measuring head, said pressure measuring head fitted therein with a rubber ring, said rubber ring provided with a press rod protruding outward from the center, with an air intake passageway formed between said rubber ring and said press rod, said air intake passage communicating with the interior of said hollow body, said pressure measuring head having its outside fitted with a metallic protecting ring, said pressure measuring head having its backside formed integral with an exhausting push rod, said exhausting push rod not communicating with the interior of said hollow body, said hollow body having said open end provided with a combining unit;
   a coiled spring received in said accommodating space of said hollow body, said coiled spring having its upper end fitted with a piston facing said pressure measuring head, said piston pushing against the lower edge of said annular stepped surface of said accommodating space;
   a scale rod received in said coiled spring, said scale rod together with said coiled spring positioned in said hollow body, said scale rod having its outer wall marked with graduations, said scale rod having its lower end fitted with a stop ring and a stop sleeve; and
   a fixing cap combined with said combining unit of said open end of said hollow body, said fixing cap having one end of its inner wall formed with a stop wall, said stop wall stopping and restricting said stop sleeve and other components from dropping out of said hollow body.

2. The pen-shaped tire pressure gauge as claimed in claim 1, wherein said combining unit of said open end of said hollow body is bored with two opposed insert grooves and two opposed engage holes in the inner wall of said open end, and said fixing cap has its outer wall formed integral with two opposed engage projections, said two engage projections correspondingly moved along said two insert grooves and engaged in said two engage holes.

3. The pen-shaped tire pressure gauge as claimed in claim 1, wherein said combining unit of said open end of said hollow body has the inner wall of said open end formed with female threads, while said fixing cap has its outer wall formed with male threads so that said fixing cap can be threadably combined with said open end of said hollow body.

4. The pen-shaped tire pressure gauge as claimed in claim 1, wherein said combining unit of said open end has the outer wall of said open end formed with male threads, while said fixing cap has its inner wall formed with female threads to threadably combine said fixing cap with said open end.

5. The pen-shaped tire pressure gauge as claimed in claim 1, wherein an air intake hole is bored at the bottom of one side of said press rod of said pressure measuring head to communicate said accommodating space with said air intake passageway.

6. The pen-shaped tire pressure gauge as claimed in claim 1, wherein said hollow body has its outer wall fixed with a pen clip near said pressure measuring head.

* * * * *